United States Patent
McCorkendale et al.

(10) Patent No.: US 8,977,842 B1
(45) Date of Patent: Mar. 10, 2015

(54) HYPERVISOR ENABLED SECURE INTER-CONTAINER COMMUNICATIONS

(75) Inventors: Bruce McCorkendale, Manhattan Beach, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 1219 days.

(21) Appl. No.: 12/701,399

(22) Filed: Feb. 5, 2010

(51) Int. Cl.
H04L 29/06 (2006.01)
H04L 9/08 (2006.01)

(52) U.S. Cl.
USPC .......................... 713/152; 380/285

(58) Field of Classification Search
USPC .......................... 713/152; 380/285
See application file for complete search history.

(56) References Cited

U.S. PATENT DOCUMENTS

| | | | | |
|---|---|---|---|---|
| 5,222,134 A * | 6/1993 | Waite et al. | ...... | 705/59 |
| 7,206,412 B2 * | 4/2007 | Yokota et al. | ...... | 380/278 |
| 7,730,297 B1 * | 6/2010 | Pravetz | ...... | 713/152 |
| 7,987,497 B1 * | 7/2011 | Giles et al. | ...... | 726/2 |
| 2008/0022094 A1 * | 1/2008 | Gupta et al. | ...... | 713/165 |
| 2009/0214040 A1 * | 8/2009 | Funk et al. | ...... | 380/277 |
| 2010/0082991 A1 * | 4/2010 | Baldwin et al. | ...... | 713/176 |

OTHER PUBLICATIONS

Reiser et al., VM-FIT: supporting Intrusion Tolerance with Virtualization Technology, 2007, Retrieved from the Internet <URL:. di.fc.ul.pt/~nuno/PAPERS/TR-07-5.pdf>, pp. 1-7 as printed.*

VMware ESX 4.1, Understanding Memory Resource Management in VMware ESX 4.1, Retrieved from the Internet <URL:.vmware. com/files/pdf/techpaper/vsp_41_perf_memory_mgmt.pdf>, pp. 1-25 as printed.*

Chadha, Vineet; Provisioning Wide-Area Virtual Environments Through I/O Interposition . . . ; 2008; Retrieved from the Internet <URL: etd.fcla.edu/UF/UFE0022662/chadha_v.pdf>; pp. 1-145 as printed.*

VMsafe: A Security Technology for Virtualized Environments, 2009, VMware VMsafe Security Technology, retrieved from the Internet http://www.vmware.com/technical-resources/security/ vmsafe/se . . . .

Security Providers Leverage VMsafe to Protect the Virtual Datacenter, 2009, VMware VMsafe Security Technology, retrieved from the Internet http: www.vmware.com/technical-resources/security/vmsafe/u . . . .

* cited by examiner

*Primary Examiner* — Michael Chao
(74) *Attorney, Agent, or Firm* — Brill Law Office; Jeffrey Brill

(57) ABSTRACT

A secure component communication management system provides secure, trusted communication between components in a hypervisor based virtual computing environment. A hypervisor security extension generates a container level private key/public key pair. The hypervisor security extension container injects the container level public key into one or more VM(s) that are to securely receive trustworthy data. The hypervisor security extension container encrypts data to transmit to VMs with the container level private key, and injects the encrypted data into one or more target VM(s), such that the injected data is trusted by the VM(s). The one or more VM(s) receive the container level public key and data encrypted with the container level private key, injected by the hypervisor security extension container. These VM(s) use the public key to decrypt injected data encrypted with the private key, such that the decrypted data is trusted.

19 Claims, 6 Drawing Sheets

HYPERVISOR ENABLED SECURE INTER-CONTAINER COMMUNICATIONS

TECHNICAL FIELD

This disclosure pertains generally to computer security, and more specifically to providing secure communications between components in a virtual computing environment with a hypervisor enabled security container.

BACKGROUND

Many computer security systems involve two or more disparate components that communicate with one another. Such a system is only secure to the extent that each component remains secure. For the security system as a whole to be considered trustworthy, it must be known that each communicating component of the system has not been tampered with or spoofed by malicious code or a malicious party. Without a mechanism to verify the integrity of the communicating components, it cannot be know if the security system is being manipulated by an attacker, or whether the information being transmitted is valid.

A Trusted Platform Module (TPM) is a secure cryptoprocessor chip configured according to a specific, defined standard. One security feature supported by TPM is secure public-key encryption. TPM provides a public and private key pair, which is created randomly on the TPM hardware at manufacture time and cannot be changed. The private key never leaves the TPM chip, while the public key can be used for secure communication with the TPM. Any content encrypted by the TPM's private key can be assumed to be legitimate and secure, as the TPM's private key never leaves the hardware and cannot be accessed from outside of the TPM. Thus, a TPM enables a type of trusted communication, but this is limited in flexibility because the trusted content must be encrypted by the TPM hardware, with a single private key that is static to that hardware.

In the world of virtual computing, multiple virtual machines (VMs or guests) can be instantiated at a software level on a single physical computer (host computer). In various virtualization scenarios, a software component often called a hypervisor can act as an interface between the guests and the host operating system for some or all of the functions of the guests. In other virtualization implementations, there is no underlying host operating system running on the physical, host computer. In those situations, the hypervisor acts as an interface between the guests and the hardware of the host computer. Even where a host operating system is present, the hypervisor sometimes interfaces directly with the hardware for certain services. In some virtualization scenarios, the host itself is in the form of a guest (i.e., a virtual host) running on another host. The services described herein as being performed by a hypervisor are, under certain virtualization scenarios, performed by a component with a different name, such as "supervisor virtual machine," "virtual machine manager (VMM)," "service partition," or "domain 0 (dom0)." The name used to denote the component(s) performing specific functionality is not important.

VMware has a security product called VMsafe®, that operates in a virtual computing environment as a security extension of a hypervisor. VMsafe® exposes an API which third parties can use to provide services (including security services) to VMs running in the virtual environment. Such third party services are provided from service VMs, which cannot directly interact with the VMs to which they are providing services, but only through the VMsafe® API. By interacting with the VMSafe® API, a service VM can direct the VMsafe® hypervisor extension to extend a service to a served VM. Because VMsafe® is instantiated at a hypervisor level, it is isolated from both the VMs providing services through VMsafe® and from the VMs to which the services are being provided. The VMsafe® hypervisor extension can be thought of as a container that extends services from third party service VMs to served VMs without requiring or allowing direct communication between the two. This provides a level of isolation between the VMs, such that a service providing VM (referred to as a security VM, or SVM in VMware) cannot directly be accessed (and, for example, corrupted) by a served VM. To provide a service to target VMs, the VMsafe® hypervisor extension instantiates and directs companion components within the VMs receiving the service. It is to be understood that VMsafe® is a specific example of a commercial product providing a hypervisor security extension container, and this functionality could be provided by other products from other companies with different trade names.

Although VMsafe® provides a level of isolation between VMs, it does not ensure that information exchanged between the security enhanced hypervisor extension container, the VMs providing the services, the VMs receiving services, the VM companion components and any remote servers is legitimate and has not been tampered with by one of the various components involved in the communication. In other words, with or without a hypervisor security extension container, a system of communicating computer components can only be considered secure where each component is known to be secure. It would be desirable to address these issues.

SUMMARY

A secure component communication management system provides secure, trusted communication between components in a hypervisor based virtual computing environment running on at least one physical computer. A hypervisor security extension container (such as a VMsafe® API security container or a similar component in the case of a different hypervisor extended VM environment) generates a hypervisor security extension container level private key/public key pair. The hypervisor security extension container encrypts data to transmit to VMs with the hypervisor security extension container level private key, and injects the encrypted data into one or more target VM(s), such that the injected data is trusted by the VM(s).

In some embodiments, the hypervisor security extension container receives data from a first VM (or other trusted source) to be transmitted to a second VM. In such a scenario, the hypervisor security extension container encrypts the received data with the hypervisor security extension container level private key, and injects the resulting encrypted data into the second VM, such that the injected data is trusted by the second VM. In another embodiment, the hypervisor security extension container uses the container level private key to encrypt the data in place in the first VM, and the first VM then transmits the encrypted data to the second VM. In some embodiments, the hypervisor security extension container injects the container level public key into VMs that are to receive encrypted data, such that a receiving VM can decrypt the data itself. In other embodiments, the hypervisor security extension container uses the container level public key to decrypt data in place in receiving VM(s), in which case no keys are provided thereto.

At the VM level, one or more VM(s) receive encrypted with the hypervisor security extension container level private key, injected by the hypervisor security extension container or transmitted by another VM. In some embodiments, a receiving VM also receives the hypervisor security extension container level public key injected by the hypervisor, in which case it can use it to decrypt injected data encrypted with the hypervisor security extension container level private key. In other embodiments, a receiving VM does not receive a key, but instead the hypervisor security extension container decrypts the data in place in the receiving VM. In some embodiments, the hypervisor security extension container generates replacement hypervisor security extension container level private and public keys from time to time. In such embodiments, the hypervisor security extension container replaces its private key (and in some embodiments its public key) with the generated replacement private (and optionally public) key(s). In some embodiments, the hypervisor security extension container injects the replacement public key into one or more VM(s), which replace their existing public key(s) with the injected, replacement one.

In some embodiments, the hypervisor security extension container generates one or more VM level private key/public key pair(s), injects at least one VM level private key into at least one VM, and provides at least one VM level public key to at least one additional computing component, such as a trusted, remote server. In this embodiment, the VM(s) having received VM level private key(s) can transmit secure content to the additional computing component(s) having received VM level public key(s), such that the additional computing component(s) trust the received content. To do so, a VM encrypts data with its VM level private key injected by the hypervisor security extension container, and transmits the encrypted data to a target component. The target component receives the VM level public key from the hypervisor security extension container, and the data encrypted with the corresponding VM level private key from the VM. The component can thus use the received VM level public key to decrypt the received encrypted data, such that the decrypted data is trusted by the component. In other embodiments, the encryption and/or decryption in such scenarios is performed by the hypervisor security extension container in place in the VMs, without providing keys thereto.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
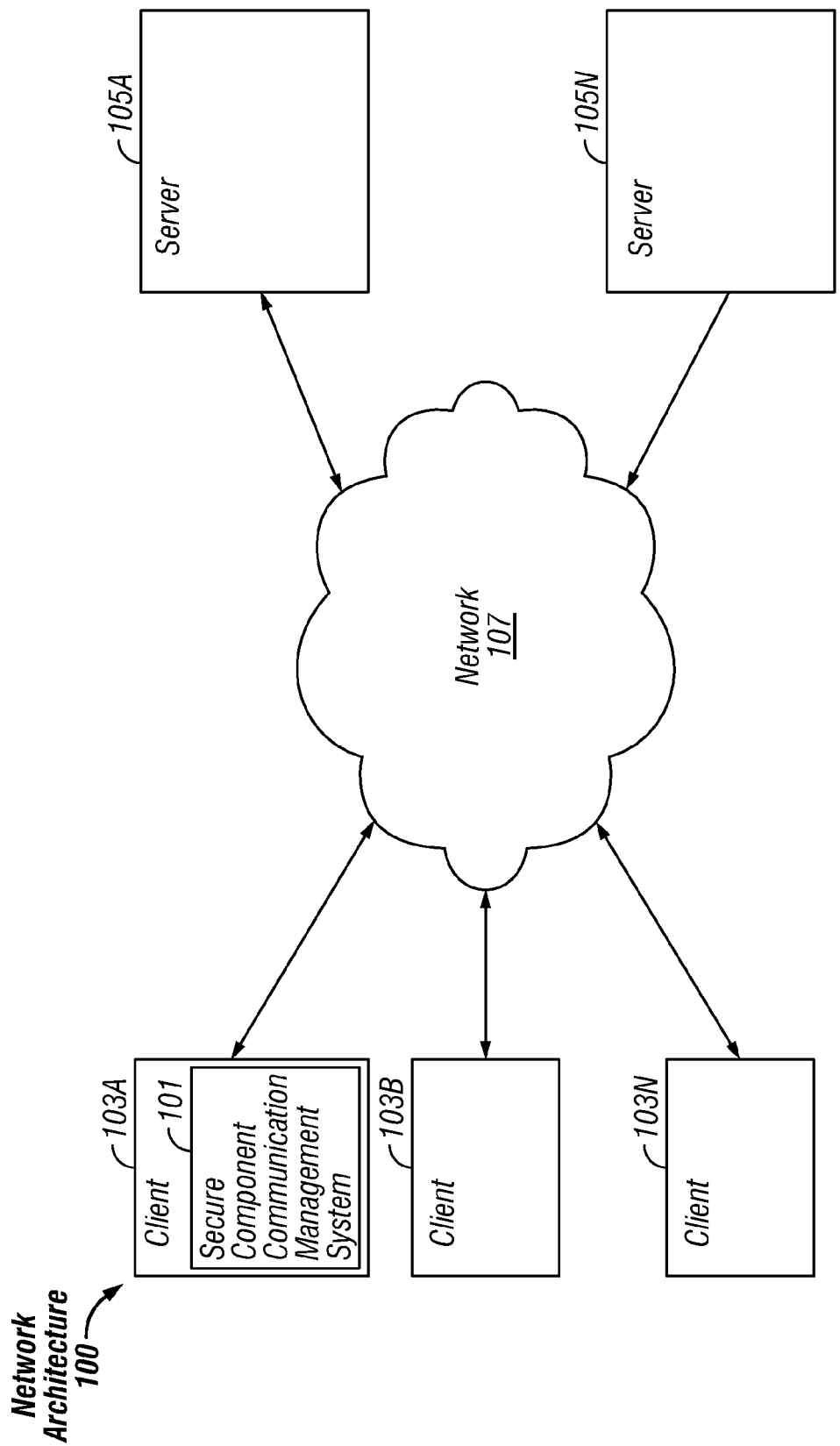
FIG. 1 is a block diagram of an exemplary network architecture in which a secure component communication management system can be implemented, according to some embodiments.

FIG. 1 is a block diagram illustrating an exemplary network architecture 100 in which a secure component communication management system 101 can be implemented. The illustrated network architecture 100 comprises multiple clients 103A, 103B and 103N, as well as multiple servers 105A and 105N. In FIG. 1, the secure component communication management system 101 is illustrated as residing on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applicants and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
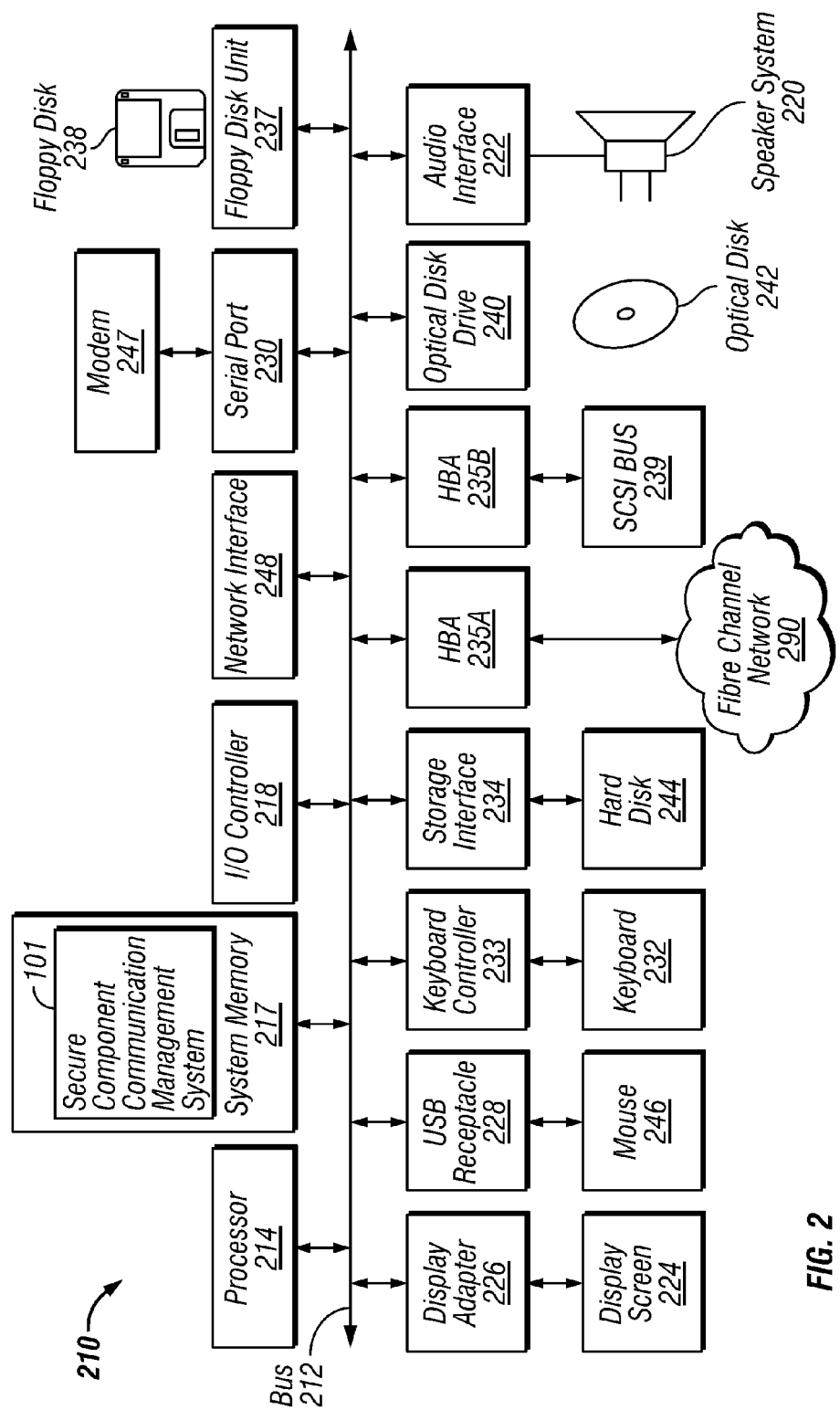
FIG. 2 is a block diagram of a computer system suitable for implementing a secure component communication management system, according to some embodiments.

FIG. 2 is a block diagram of a computer system 210 suitable for implementing a secure component communication management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the secure component communication management system 101 is illustrated as residing in system memory 217. The workings of the secure component communication management system 101 are explained in greater detail below in conjunction with FIGS. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
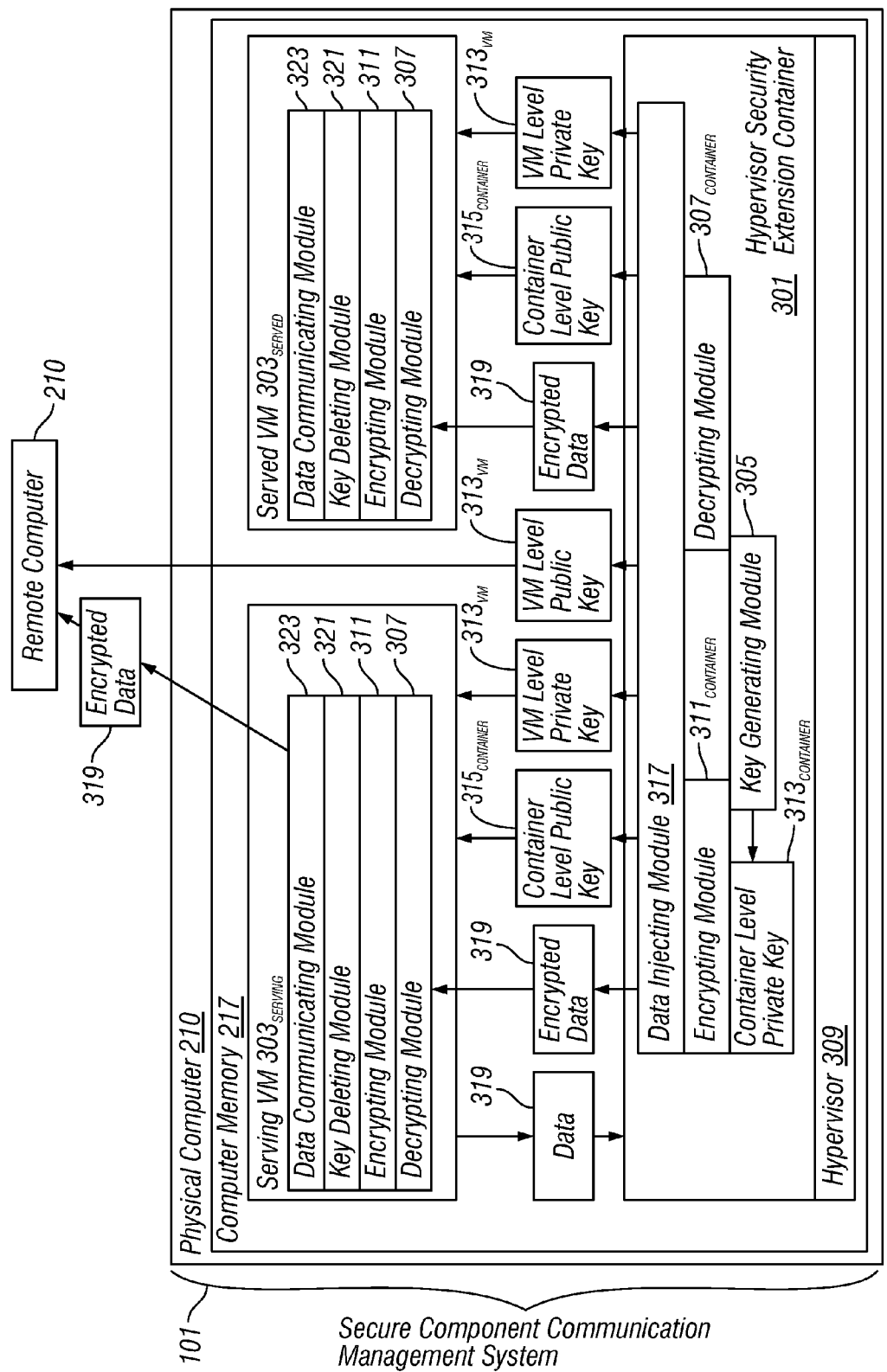
FIG. 3 is a block diagram of the operation of a secure component communication management system, according to some embodiments.

FIG. 3 illustrates the operation of a secure component communication management system 101, residing in the system memory 217 of a computer system 210 according to some embodiments. As described above, the functionalities of the secure component communication management system 101 can reside on a client 103, a server 105, or be distributed between multiple computer systems 210, including within a cloud-based computing environment in which the functionality of the secure component communication management system 101 is provided as a service over a network 107. It is to be understood that although the secure component communication management system 101 is illustrated in FIG. 3 as a single entity, the illustrated secure component communication management system 101 represents a collection of functionalities, which can be instantiated as a single or multiple modules as desired (an instantiation of specific, multiple modules of the secure component communication management system 101 is illustrated in FIG. 3). It is to be understood that the modules of the secure component communication management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the secure component communication management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a secure component communication management system 101 provides trusted communication between a hypervisor security extension container 301 (such as a VMsafe® API security container or a similar component in the case of a similar hypervisor extended VM environment), service providing VMs $303_{SERVING}$ and served VMs $303_{SERVED}$ (including for example, companion components within VMs). As illustrated, at least one service providing VM $303_{SERVING}$, at least one served VM $303_{SERVED}$, a hypervisor 309 and the hypervisor security extension container 301 all run in the computer memory 217 of a host 210, which can be in the form of a physical computer 210, for example of the type illustrated in FIG. 2. In FIG. 3, only one service providing VM $303_{SERVING}$ and one served VM $303_{SERVED}$ are shown for illustrative purposes, but in practice many more of either can be deployed. The trusted secure component communication management system 101 can enable all VMs 303 in the virtual environment under the jurisdiction of the hypervisor 309 to send and receive trusted, secure communication. This not only allows a service providing VM $303_{SERVING}$ to securely provide functionality through the hypervisor security extension container 301 to served VMs $303_{SERVED}$, but further enables trusted communication between the VMs 303 more generally, as well as between components such as VMs 303 running on the host 210 and trusted remote computers 210 (e.g., an off-box server).

As illustrated in FIG. 3, the secure component communication management system 101 can use public/private key encryption for verification of the communication. Because the hypervisor security extension container 301 is isolated from the VMs 303, an encrypting module $311_{CONTAINER}$ of the secure component communication management system 101 instantiated at the hypervisor security extension container 301 level can safely use a private key $313_{CONTAINER}$ located in the hypervisor security extension container 301 to prepare, encrypt sign or otherwise process any type of data 319 (e.g., messages, code, memory, etc.) to be communicated to a VM 303 without the possibility of the target VM 303 gaining access to the private key $313_{CONTAINER}$. A data injecting module 317 of the secure component communication management system 101 instantiated at the hypervisor security extension container 301 level can then securely inject the data 319 processed with the private key $313_{CONTAINER}$ into the address space of a target VM 303. A decrypting module $307_{VM}$ of the secure component communication management system 101 instantiated at a VM 303 level can use a corresponding public key $315_{CONTAINER}$ to decrypt and therefore verify the injected data 319 (e.g., message, code, memory, etc.).

For example, the hypervisor security extension container 301 can receive data 319 from a serving VM $303_{SERVING}$ targeted to one or more served VMs $303_{SERVED}$. The container level encrypting module $311_{CONTAINER}$ can then use the private key $313_{CONTAINER}$ to encrypt the received data 319, and the data injecting module 317 can inject the encrypted data 319 into the address space of the target, served VM(s) $303_{SERVED}$.

In some embodiments, when a VM 303 has data 319 to encrypt and transmit, rather than providing the data 319 to the hypervisor security extension container 301, the VM 303 maintains the data locally, and requests that the hypervisor security extension container 301 encrypt it. The container level encrypting module $311_{CONTAINER}$ of the secure component communication management system 101 then uses its private key $313_{CONTAINER}$ to encrypt the data 319 in place in the VM 303. A VM level data communicating module 323 can then transmit the encrypted data 319 to the target, served VM(s) $303_{SERVED}$. This same scenario can be applied in reverse. In other words, in some embodiments, when a served VM $303_{SERVED}$ receives encrypted data 319, rather than decrypting it with a local copy of the public key $315_{CONTAINER}$, the receiving VM 303 requests that the hypervisor security extension container 301 decrypt the data 319. A container level decrypting module $307_{CONTAINER}$ of the secure component communication management system 101 then uses its public key $315_{CONTAINER}$ to decrypt the data 319 in place in the VM $303_{SERVED}$. In these embodiments, no keys 313/315 need to be exposed to any VMs 303, which provides an additional level of security.

In one embodiment, the container level encrypting module $311_{CONTAINER}$ uses a single static private key $313_{CONTAINER}$ for encrypting data 319 to be communicated to VMs 303. In this case, the decrypting module $307_{VM}$ within a VM 303 can simply use a single (e.g., hard coded) corresponding public key $315_{CONTAINER}$ to handle the decryption. In other embodiments, a new private/public key pair $313_{CONTAINER}$, $315_{CONTAINER}$ can be generated from time to time (as frequently as for each communication session, where desired). In this case, a key generating module 305 of the secure component communication management system 101 instantiated at the hypervisor security extension container 301 level generates a new key pair as often desired. The container level encrypting module $311_{CONTAINER}$ then uses the newly generated private key $313_{CONTAINER}$ to encrypt data 319 until a new key pair is generated, the data injecting module 317 injects the newly generated public key $315_{CONTAINER}$ into the VMs 303, and the decrypting module $307_{VM}$ within a VM 303 uses the newly injected public key $315_{CONTAINER}$ to decrypt the data 319.

In other embodiments, the key generating module 305 can generate one or more VM level private key $313_{VM}$/public key $315_{VM}$ pair(s), to enable one or more VMs 303 to transmit encrypted data 319 to the hypervisor security extension container 301 (or to other components, as described below). In some embodiments, such private key(s) $313_{VM}$ are injected into the VMs 303 by the data injecting module 317. To send encrypted data 319 to the hypervisor security extension container 301, the encrypting module $311_{VM}$ of the secure component communication management system 101 instantiated on the VM 303 in question encrypts the data 319 with VM's private key $313_{VM}$, and the VM level data communicating module 323 transmits the encrypted data 319 to the hypervisor security extension container 301. A container level decrypting module $307_{CONTAINER}$ then uses the corresponding public key $315_{VM}$ to decrypt the encrypted data 319. Any keys 313, 315 to be used by any VM 303 can be injected by the container level data injecting module 317 into the target VM(s) as desired. In some embodiments, some or all keys 313, 315 to be used by a VM 303 can be injected "just in time," for example just as the VM 303 is about to decrypt and run injected code 319, or just before the VM 303 is to encrypt and transmit content 319. A key deleting module 321 of the secure component communication management system 101 instantiated at a VM 303 level can delete such "just in time" keys 313, 315 after use.

In other embodiments, rather than injecting VM level private keys $313_{VM}$ and/or public keys $315_{VM}$ into VMs 303 for this type of communication, the hypervisor security extension container 301 can maintain such keys itself, and use them to encrypt and/or decrypt data in place in VMs 303 as described above, thereby not exposing keys 313/315 to VMs 303.

It is to be understood that the above described functionality concerning a VM 303 using a VM level private key $313_{VM}$ to encrypt and transmit data 303 can also be used to secure communications between the VMs 303 themselves, and/or between the VMs 303 and trusted remote computers 210. In this case, the VM 303 or remote computer 210 receiving the encrypted data 303 can use a corresponding public key $315_{VM}$ to decrypt the data 303. Because the transmitting VM 303 used a corresponding private key $313_{VM}$ generated and injected by modules running on the hypervisor security extension container 301, the encrypted transmission from the VM 303 can be considered trustworthy and secure.

It is to be understood that the secure component communication management system 101 can use different types of key pairs in different embodiments (e.g, symmetric or asymmetric keys), but use of PKI allows for the hard coded public key 315 use case described above.

Figure 4:
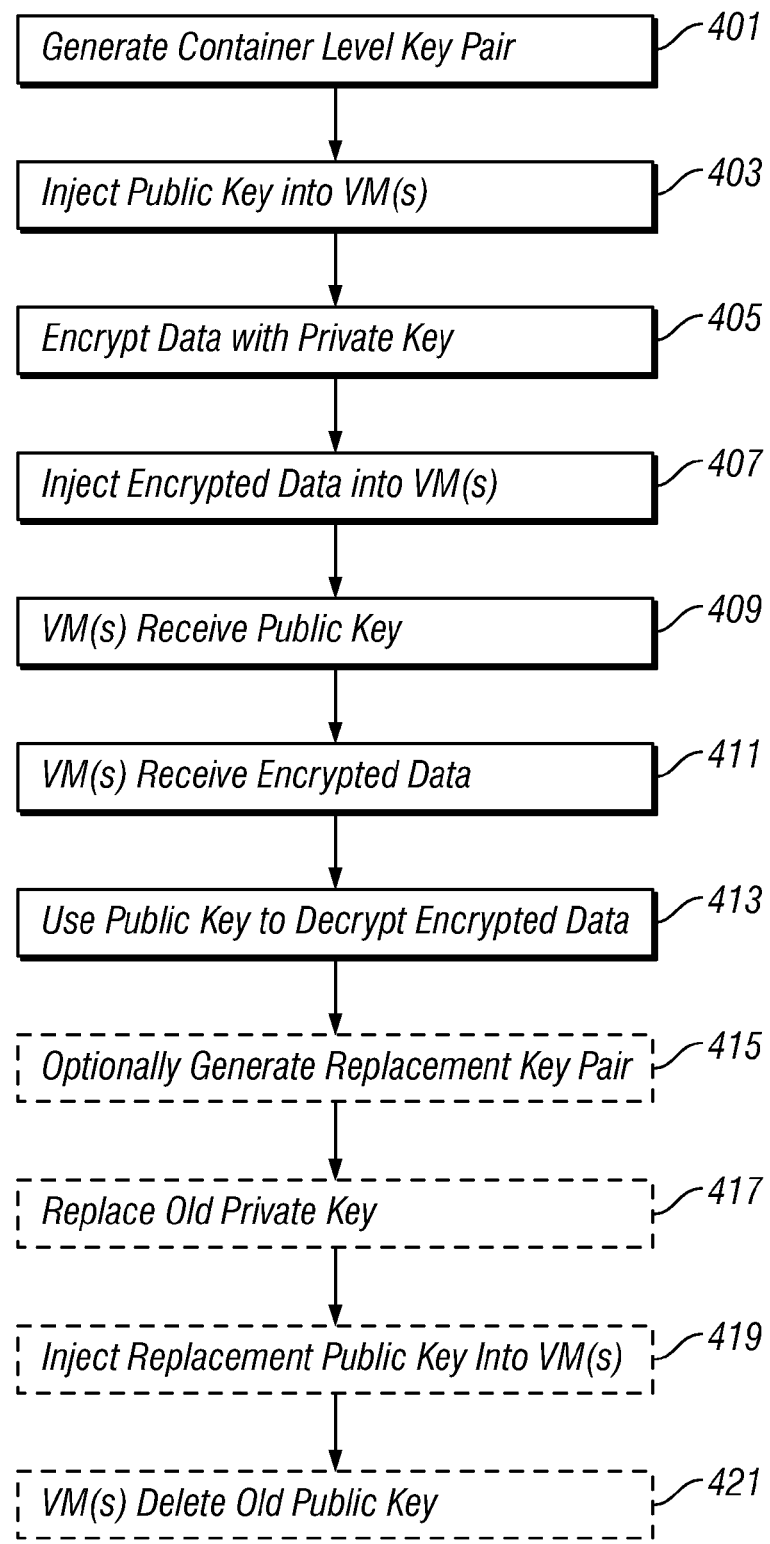
FIG. 4 is a flowchart of the operation of a secure component communication management system, according to some embodiments.

FIG. 4 illustrates the operation of a secure component communication management system 101 (FIG. 1), according to some embodiments. As illustrated in FIG. 4, the container level key generating module 305 (FIG. 3) generates 401 a hypervisor security extension container level private key/public key pair $313_{CONTAINER}$, $315_{CONTAINER}$ (FIG. 3). The container level data injecting module 317 (FIG. 3) injects 403 the hypervisor security extension container level public key $313_{CONTAINER}$ (FIG. 3) into one or more VM(s) 303 (FIG. 3) that are to securely receive trustworthy data 319 (FIG. 3). The container level encrypting module $311_{CONTAINER}$ (FIG. 3) encrypts 405 data 319 (FIG. 3) to be transmitted to VMs 303 (FIG. 3) with the hypervisor security extension container level private key $315_{CONTAINER}$ (FIG. 3). The container level data injecting module 317 (FIG. 3) injects 407 the encrypted data 319 (FIG. 3) into one or more target VM(s) 303 (FIG. 3). The VM(s) 303 (FIG. 3) receive 409 the hypervisor security extension container level public key $313_{CONTAINER}$ (FIG. 3). The VM(s) 303 (FIG. 3) also receive 411 data 319 (FIG. 3) encrypted with the hypervisor security extension container level private key $315_{CONTAINER}$ (FIG. 3). On each receiving VM 303 (FIG. 3), the VM level decrypting module $307_{VM}$ (FIG. 3) uses the hypervisor security extension container level public key $315_{CONTAINER}$ (FIG. 3) to decrypt 413 injected data 319 (FIG. 3) encrypted with the hypervisor security extension container level private key $313_{CONTAINER}$ (FIG. 3) such that the decrypted data 319 (FIG. 3) is trusted by the VM 303 (FIG. 3).

In some embodiments, the container level key generating module 305 (FIG. 3) generates 415 replacement hypervisor security extension container level private and public keys $313_{CONTAINER}$, $315_{CONTAINER}$ (FIG. 3) from time to time. In such embodiments, the container level key generating module 305 (FIG. 3) replaces 417 the old hypervisor security extension container level private key $313_{CONTAINER}$ (FIG. 3) with the new, generated replacement container level private key $313_{CONTAINER}$ (FIG. 3). The container level data injecting module 317 (FIG. 3) injects 419 the replacement container level public key $315_{CONTAINER}$ (FIG. 3) into one or more VM(s) 303 (FIG. 3), the key deleting module(s) 321 (FIG. 3) of each of which deletes 421 the old hypervisor security extension container level public key $315_{CONTAINER}$ (FIG. 3), so as to replace it with the new one.

Figure 5:
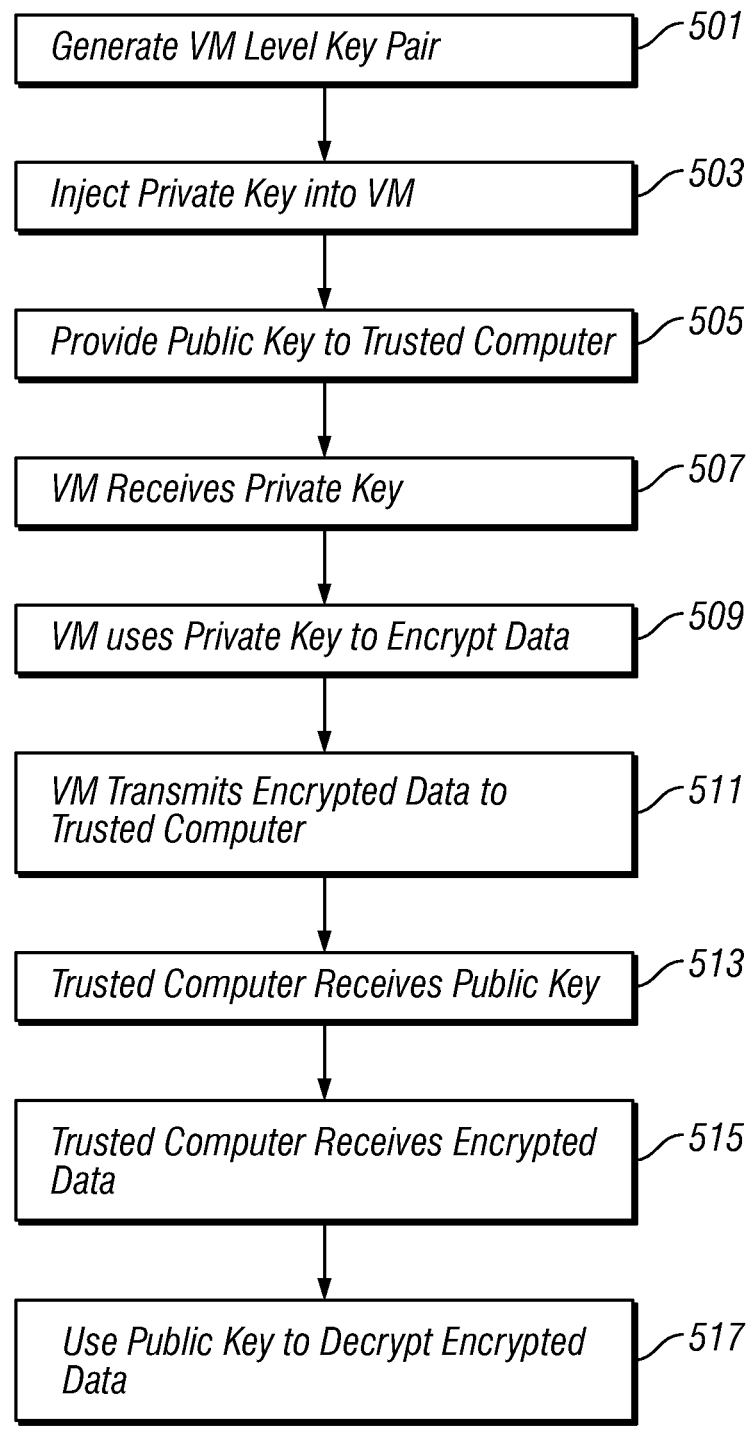
FIG. 5 is a flowchart of the operation of a secure component communication management system, according to other embodiments.

FIG. 5 illustrates the operation of a secure component communication management system 101 (FIG. 1), according to other embodiments. As illustrated in FIG. 5, in some embodiments, the hypervisor security extension container 301 (FIG. 3) enables trusted communication between VMs 303 (FIG. 3) and other trusted components, such as a remote computer 210 (FIG. 2). In such embodiments, the container level key generating module 305 (FIG. 3) generates 501 one or more VM level private key/public key pair(s) $313_{VM}$, $315_{VM}$ (FIG. 3). The container level data injecting module 317 (FIG. 3) injects 503 at least one VM level private key $313_{VM}$ (FIG. 3) into at least one VM 303 (FIG. 3). The hypervisor security extension container 301 (FIG. 3) also provides 505 at least one VM level public key $315_{VM}$ (FIG. 3) to at least one additional computing component, such as a trusted, remote server computer 210 (FIG. 2). At least one VM 303 (FIG. 3) receives 507 a VM level private key $313_{VM}$ (FIG. 3). Such a VM 303 (FIG. 3) encrypts 509 data 319 (FIG. 3) with its VM level private key $313_{VM}$ (FIG. 3). The VM 303 (FIG. 3) then transmits 511 the encrypted data 319 (FIG. 3) to the remote computer 210 (FIG. 2) (or other target component). The remote computer 210 (FIG. 2) receives 513 the VM level public key $315_{VM}$ (FIG. 3) from the container level data injecting module 317 (FIG. 3). The remote computer 210 (FIG. 2) also receives 515 the data 319 (FIG. 3) encrypted with the corresponding VM level private key $313_{VM}$ (FIG. 3) from the VM 303 (FIG. 3). The remote computer 210 uses the received VM level public key $315_{VM}$ (FIG. 3) to decrypt 517 the received encrypted data 319 (FIG. 3), such that the decrypted data 319 (FIG. 3) is trusted by the remote computer 210.

Figure 6:
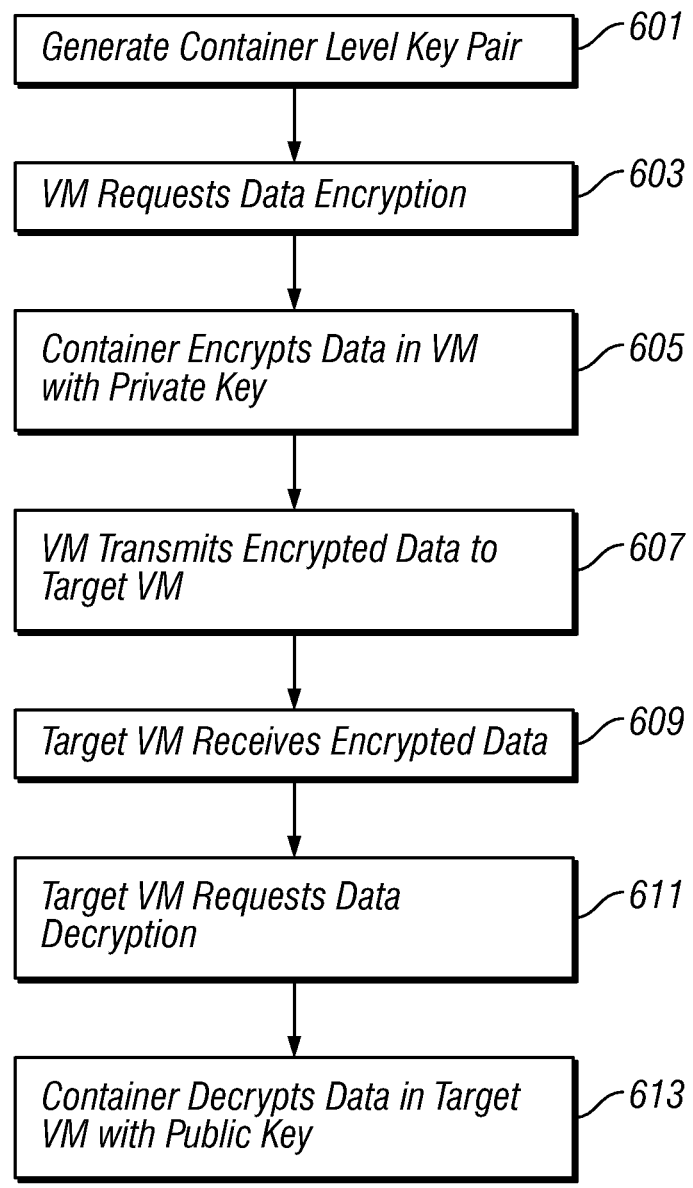
FIG. 6 is a flowchart of the operation of a secure component communication management system, according to yet other embodiments.

FIG. 6 illustrates the operation of a secure component communication management system 101 (FIG. 1), according to other embodiments. As illustrated in FIG. 6, in some embodiments, the container level key generating module 305 (FIG. 3) generates 601 a hypervisor security extension container level private key/public key pair $313_{CONTAINER}$, $315_{CONTAINER}$ (FIG. 3). A VM 303 requests 603 that the hypervisor security extension container 301 (FIG. 3) encrypt data 319 (FIG. 3) to be transmitted to one or more target VM(s) 303 (FIG. 3). The container level encrypting module $311_{CONTAINER}$ (FIG. 3) encrypts 605 data 319 (FIG. 3) in place in the VM 303 (FIG. 3) with the hypervisor security extension container level private key $315_{CONTAINER}$ (FIG. 3). The VM level data communicating module 323 (FIG. 3) transmits 607 the encrypted data 319 (FIG. 3) to the target VM(s) 303 (FIG. 3). The target VM(s) 303 (FIG. 3) receive(s) 609 the encrypted data 319 (FIG. 3), and request(s) 611 that the hypervisor security extension container 301 decrypt it. The container level decrypting module $307_{CONTAINER}$ of the secure component communication management system 101 decrypts 613 the data 319 in place in the VM(s) 303, using its public key $315_{CONTAINER}$.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method for providing secure communication for virtual machines, the method comprising the steps of:
   executing a hypervisor security extension container that is coupled between a hypervisor and each of the virtual machines separately, the hypervisor managing the virtual machines;
   generating a hypervisor security extension container level private key within the hypervisor security extension container running on at least one physical computer;
   generating a hypervisor security extension container level public key within the hypervisor security extension container running on at least one physical computer;
   encrypting data with the hypervisor security extension container level private key, by the hypervisor security extension container in response to a request from a transmitting virtual machine, the data being encrypted by the hypervisor security extension container in place in the transmitting virtual machine, without providing the hypervisor security extension level private key to the transmitting virtual machine; and
   providing encrypted data encrypted with the hypervisor security extension container level private key from the transmitting virtual machine to at least one of the virtual machines other than the transmitting virtual machine.

2. The method of claim 1 further comprising:
   receiving, from a first virtual machine, data targeted to a second virtual machine, by the hypervisor security extension container running on at least one physical computer;
   encrypting the data received from the first virtual machine with the hypervisor security extension container level private key, by the hypervisor security extension container running on at least one physical computer;
   injecting the hypervisor security extension container level public key into the second virtual machine, by the hypervisor security extension container running on at least one physical computer; and
   injecting the received data encrypted with the hypervisor security extension container level private key into the second virtual machine, by the hypervisor security extension container running on at least one physical computer, such that the injected data is trusted by the second virtual machine.

3. The method of claim 1 further comprising:
   receiving, by at least one virtual machine, a hypervisor security extension container level public key, injected by the hypervisor security extension container;
   receiving, by at least one virtual machine, data encrypted with the hypervisor security extension container level private key, injected by the hypervisor security extension container; and
   using, by at least one virtual machine, the hypervisor security extension container level public key to decrypt injected data encrypted with the hypervisor security extension container level private key, such that the decrypted data is trusted by the at least one virtual machine.

4. The method of claim 1 further comprising:
   generating at least one replacement hypervisor security extension container level private key, by the hypervisor security extension container running on at least one physical computer;

generating at least one replacement hypervisor security extension container level public key, by the hypervisor security extension container running on at least one physical computer;

replacing the hypervisor security extension container level private key with the generated replacement hypervisor security extension container level private key, by the hypervisor security extension container running on at least one physical computer; and replacing the hypervisor security extension container level public key with the generated replacement hypervisor security extension container level public key, by the hypervisor security extension container running on at least one physical computer.

5. The method of claim 1 further comprising:

receiving a replacement hypervisor security extension container level public key, by at least one virtual machine, the received replacement hypervisor security extension container level public key being injected by the hypervisor security extension container running on at least one physical computer; and replacing a hypervisor security extension container level public key, by the at least one virtual machine, with the injected replacement hypervisor security extension container level public key.

6. The method of claim 1 further comprising:

generating at least one virtual machine level private key, by the hypervisor security extension container running on at least one physical computer; and generating at least one virtual machine level public key, by the hypervisor security extension container running on at least one physical computer.

7. The method of claim 6 further comprising:

providing the at least one virtual machine level public key to at least one additional computing component, by the hypervisor security extension container running on at least one physical computer.

8. The method of claim 6 further comprising:

receiving, by at least one virtual machine, a virtual machine level private key, injected by the hypervisor security extension container running on at least one physical computer;

encrypting data on the at least one virtual machine, by the at least one virtual machine, with the virtual machine level private key injected by the hypervisor security extension container running on at least one physical computer; and transmitting the encrypted data, by the at least one virtual machine, to at least one additional computing component.

9. The method of claim 8 further comprising:

receiving a virtual machine level public key, from the hypervisor security extension container running on at least one physical computer, by an additional computing component;

receiving data encrypted on a virtual machine with a virtual machine level private key, from a virtual machine, by the additional computing component; and using the virtual machine level public key to decrypt received encrypted data, by the additional computing component, such that the decrypted data is trusted by the additional computing component.

10. The method of claim 1 further comprising:

receiving, by the hypervisor security extension container running on at least one physical computer, a request from a virtual machine to decrypt data; and decrypting the data in place in the virtual machine, by the hypervisor security extension container running on at least one physical computer, without providing a key to the virtual machine.

11. At least one non-transitory computer readable storage medium storing a computer program product for providing secure communication for virtual machines, the computer program product comprising:

program code for executing a hypervisor security extension container that is coupled between a hypervisor and each of the virtual machines separately, the hypervisor managing the virtual machines;

program code for generating a hypervisor security extension container level private key, by a hypervisor security extension container;

program code for generating a hypervisor security extension container level public key within the hypervisor security extension container;

program code for encrypting data with the hypervisor security extension container level private key, by the hypervisor security extension container in response to a request from a transmitting virtual machine, the data being encrypted by the hypervisor security extension container in place in the transmitting virtual machine, without providing the hypervisor security extension level private key to the transmitting virtual machine; and program code for providing encrypted data encrypted with the hypervisor security extension container level private key from the transmitting virtual machine to at least one of the virtual machines other than the transmitting virtual machine.

12. The computer program product of claim 11 further comprising:

program code for receiving, from a first virtual machine, data targeted to a second virtual machine, by the hypervisor security extension container;

program code for encrypting the data received from the first virtual machine with the hypervisor security extension container level private key, by the hypervisor security extension container;

program code for injecting the hypervisor security extension container level public key into the second virtual machine, by the hypervisor security extension container; and program code for injecting the received data encrypted with the hypervisor security extension container level private key into the second virtual machine, by the hypervisor security extension container, such that the injected data is trusted by the second virtual machine.

13. The computer program product of claim 11 further comprising:

program code for receiving, by at least one virtual machine, a hypervisor security extension container level public key, injected by the hypervisor security extension container;

program code for receiving, by at least one virtual machine, data encrypted with the hypervisor security extension container level private key, injected by the hypervisor security extension container; and program code for using, by at least one virtual machine, the hypervisor security extension container level public key to decrypt injected data encrypted with the hypervisor security extension container level private key, such that the decrypted data is trusted by the at least one virtual machine.

14. The computer program product of claim 11 further comprising:
- program code for generating at least one virtual machine level private key, by the hypervisor security extension container; and
- program code for generating at least one virtual machine level public key, by the hypervisor security extension container.

15. The computer program product of claim 14 further comprising:
- program code for receiving, by at least one virtual machine, a virtual machine level private key, injected by the hypervisor security extension container;
- program code for encrypting data on the at least one virtual machine, by the at least one virtual machine, with the virtual machine level private key injected by the hypervisor security extension container; and
- program code for transmitting the encrypted data, by the at least one virtual machine, to at least one additional computing component.

16. The computer program product of claim 15 further comprising:
- program code for receiving a virtual machine level public key, from the hypervisor security extension container, by an additional computing component;
- program code for receiving data encrypted on a virtual machine with a virtual machine level private key, from a virtual machine, by the additional computing component; and
- program code for using the virtual machine level public key to decrypt received encrypted data, by the additional computing component, such that the decrypted data is trusted by the additional computing component.

17. The computer program product of claim 11 further comprising:
- program code for receiving, by the hypervisor security extension, a request from a virtual machine to decrypt data; and
- program code for decrypting the data in place in the virtual machine, by the hypervisor security extension container, without providing a key to the virtual machine.

18. A computer system providing secure communication for virtual machines, the computer system comprising:
- a physical processor to execute a hypervisor security extension container that is coupled between a hypervisor and each of the virtual machines separately, the hypervisor managing the virtual machines; and
- physical computer memory,
- wherein the hypervisor security extension container comprises:
  - a key generating module to generate a hypervisor security extension container level private key and a hypervisor security extension container level public key;
  - an encrypting module to encrypt data with the hypervisor security extension container level private key in response to a request from a transmitting virtual machine, in place in the transmitting virtual machine, without providing the hypervisor security extension level private key to the transmitting virtual machine; and
  - a data communicating module to provide encrypted data encrypted with the hypervisor security extension container level private key from the transmitting virtual machine to a receiving virtual machine, such that the provided data is trusted by the receiving virtual machine.

19. The computer system of claim 18 further comprising:
- a decrypting module configured to decrypt data with the hypervisor security extension container level public key in response to a request from a virtual machine, the data being decrypted in place of the requesting virtual machine, without providing a hypervisor security extension level key to the requesting virtual machine.

* * * * *